US012780151B2

(12) United States Patent
Ehrmann et al.

(10) Patent No.: US 12,780,151 B2
(45) Date of Patent: Nov. 3, 2026

(54) ROOF MODULE FOR FORMING A VEHICLE ROOF COMPRISING A CLEANING NOZZLE

(71) Applicant: Webasto SE, Stockdorf (DE)

(72) Inventors: Maximilian Ehrmann, Stockdorf (DE); Dirk Auerswald, Stockdorf (DE); Alexander Kilias, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 645 days.

(21) Appl. No.: 17/894,348

(22) Filed: Aug. 24, 2022

(65) Prior Publication Data

US 2023/0074027 A1 Mar. 9, 2023

(30) Foreign Application Priority Data

Sep. 3, 2021 (DE) ..................... 10 2021 122 884.0

(51) Int. Cl.
*B60S 1/52* (2006.01)
*B60S 1/08* (2006.01)

(52) U.S. Cl.
CPC ............... *B60S 1/52* (2013.01); *B60S 1/0822* (2013.01)

(58) Field of Classification Search
CPC .. B60S 1/52; B60S 1/0822; B60S 1/56; B60S 1/50; B60R 11/04; B26D 25/06
USPC ............................................................ 15/322
See application file for complete search history.

(56) References Cited

U.S. PATENT DOCUMENTS 1,902,254 A 3/1933 Morehouse
4,838,603 A 6/1989 Masoero et al.
9,919,748 B2 * 3/2018 Williams ............... B62D 35/00
11,780,409 B2 * 10/2023 Hamilton ............. H04N 23/811 134/99.1
2001/0035662 A1 11/2001 Pike et al.
2003/0066909 A1 4/2003 Jenkins
2003/0155001 A1 8/2003 Hoetzer
2013/0094086 A1 4/2013 Bochenek
2018/0361997 A1 * 12/2018 Schmidt ................. G02B 27/00
2020/0180563 A1 6/2020 Gilbertson
(Continued)

FOREIGN PATENT DOCUMENTS

CN 112550228 A 3/2021
CN 112770946 A 5/2021
(Continued)

OTHER PUBLICATIONS

Office Action issued in corresponding German Application No. 202211072862.6; mailed Jan. 26, 2025; In Chinese with English machine translation 18 pages).

*Primary Examiner* — Katina N. Henson

(74) *Attorney, Agent, or Firm* — Fitch, Even, Tabin & Flannery, LLP

(57) ABSTRACT

A roof module for forming a vehicle roof on a motor vehicle. The roof module may have a panel component which at least partially forms a roof skin of the vehicle roof, the roof skin serving as an outer sealing surface of the roof module; at least one environment sensor configured to send and/or receive electromagnetic signals through a see-through area for detecting a vehicle environment; and at least one cleaning nozzle configured to clean the see-through area. At least one flow guide element is disposed on the panel component, the flow guide element being configured to focus headwind onto at least part of the see-through area.

10 Claims, 4 Drawing Sheets

(56) References Cited

U.S. PATENT DOCUMENTS

| | | | | |
|---|---|---|---|---|
| 2020/0398765 | A1* | 12/2020 | Krishnan | B60R 11/04 |
| 2021/0088668 | A1 | 3/2021 | Hahn | |
| 2021/0241752 | A1 | 8/2021 | Huelsen | |
| 2021/0387597 | A1 | 12/2021 | Trebouet | |
| 2022/0169314 | A1* | 6/2022 | Huelsen | B62D 29/043 |

FOREIGN PATENT DOCUMENTS

| | | | | |
|---|---|---|---|---|
| CN | 113200051 | A | 8/2021 | |
| DE | 2945860 | A1 | 5/1981 | |
| DE | 3884826 | T2 | 2/1994 | |
| DE | 10012004 | A1 | 9/2001 | |
| DE | 60100893 | T2 | 5/2004 | |
| DE | 60116294 | T2 | 7/2006 | |
| DE | 102016221858 | A1 * | 5/2018 | B60R 11/04 |
| DE | 102018114152 | A1 | 12/2018 | |
| WO | 1998028084 | A1 | 7/1998 | |
| WO | 2002066291 | A1 | 8/2002 | |

* cited by examiner

ROOF MODULE FOR FORMING A VEHICLE ROOF COMPRISING A CLEANING NOZZLE

CROSS-REFERENCE TO RELATED APPLICATION

This application claims priority from German patent application no. 10 2021 122 884.0 filed on Sep. 3, 2021, which is hereby incorporated herein by reference in its entirety for all purposes.

FIELD

The invention relates to a roof module for forming a vehicle roof on a motor vehicle according to the preamble of claim 1.

BACKGROUND

Generic roof modules are widely used in vehicle manufacturing since these roof modules can be pre-fabricated as separate functional modules and can be delivered to the assembly line when assembling the vehicle. The roof module at least partially forms a roof skin of the vehicle roof at its outer surface, the roof skin preventing moisture and air flows from entering the vehicle interior. The roof skin is composed of one or more panel components, which can be made of a stable material, such as painted metal or painted or died-through plastic. The roof module can be a part of a fixed vehicle roof or a part of an openable roof sub-assembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of von environment sensors (e.g., lidar sensors, radar sensors, (multi-)cameras, etc. including other (electrical) components) are employed, which are integrated in the roof module, for example, and which detect the environment surrounding the motor vehicle and determine, for example, a current traffic situation from the detected environment data. Roof modules which are equipped with a plurality of environment sensors are also known as roof sensor modules (RSM). For this purpose, the known environment sensors send and/or receive suitable electromagnetic signals, such as laser beams or radar beams, allowing a data model of the vehicle environment to be generated by suitable signal evaluation and to be used for controlling the vehicle.

The environment sensors for monitoring and detecting the vehicle environment are typically mounted on the vehicle roof since the vehicle roof is typically the highest point of a vehicle, from where the vehicle environment is easily visible. The environment sensors are typically placed on top of the panel component of the roof module, which forms the roof skin, as attachments; alternatively, they can also be disposed in an opening of the roof module and be adjustable between a retracted position and a deployed position.

When the environment sensor is in use, ambient conditions (e.g., weather) pose the risk that a ((partially) transparent) see-through area, through which the environment sensor detects the vehicle environment, accumulates dirt, i.e., becomes opaque to the environment sensor. For cleaning the see-through area, the use of cleaning nozzles by means of which the see-through area can be cleaned is known. Similar to spray nozzles of a windshield wiper system, the known cleaning nozzles are typically disposed statically in an area of the roof module or the panel component that is located in front of the environment sensor when viewed in the direction of an optical axis of the environment sensor. The cleaning nozzles can basically be disposed in the field of view of the environment sensor or outside of the field of view; it is preferable for them to be disposed outside of the field of view for the sake of precision of detection of the environment sensor.

The known cleaning systems typically comprise at least one cleaning nozzle, through which a fluid cone for cleaning the see-through area can be produced by means of a cleaning fluid, such as a liquid or a gas (such as pressurized air). The cleaning fluid is typically pressurized to a pressure of 2 to 3 bar or more, which is provided by a pump (in the case of a liquid) or a compressor (in the case of a gas). The pressurized cleaning fluid is sprayed onto the surface to be cleaned through the cleaning nozzle and can reach an exit speed of 36 km/h (corresponds to 10 m/s). Since the cleaning nozzle is preferably disposed outside of the field of view of the environment sensor, which is accompanied by an improved cleaning effect, the at least one cleaning nozzle is usually disposed in such a manner that a main exit direction of the cleaning nozzle is oblique to the optical axis of the of the environment sensor. When the cleaning system is used while the vehicle is driving, this oblique orientation, in particular, can have the effect that at least part of the cleaning fluid is blown away by headwind and by potentially added ambient wind and does no longer strike the surface to be cleaned at high vehicle speeds. This has a negative impact on the cleaning effectiveness of the cleaning system. Instead, the cleaning fluid is deflected by headwind and does not strike the see-through area at all or at a sufficient degree, this negative effect becoming stronger as an angle of inclination between the main exit direction and the optical axis of the environment sensor increases.

SUMMARY

On the basis of the disadvantages mentioned above, which can occur in conventional cleaning systems, an object of the invention is therefore to propose a roof module with at least one cleaning nozzle which avoids the disadvantages of the known state of the art described above.

This object is attained by a roof module according to the teaching of claim 1.

Advantageous embodiments of the invention are the subject matter of the dependent claims.

The roof module according to the invention for forming a vehicle roof on a motor vehicle comprises a panel component which at least partially forms a roof skin of the vehicle roof, the roof skin serving as an outer sealing surface of the roof module. The roof module comprises at least one environment sensor configured to send and/or receive electromagnetic signals through a see-through area for detecting a vehicle environment around an optical axis of the environment sensor. Furthermore, the roof module comprises at least one cleaning nozzle configured to clean the see-through area. The cleaning nozzle preferably produces a fluid cone of a cleaning fluid, which can strike the see-through area to clean it. The roof module according to the invention is characterized in that at least one flow guide element is disposed on the panel component, the flow guide element being configured to focus headwind (and potentially added (sometimes turbulent) ambient wind) on at least part (or a portion) of the see-through area to thus also focus the preferably produced fluid cone or cleaning jet onto the see-through area. The headwind is preferably directed at (i.e., focused onto) the see-through area by the flow guide element (in particular in the form of a directed flow guidance). The headwind is preferably used as support, i.e., as a carrier for the cleaning fluid exiting the cleaning nozzle, and is directed at the see-through area (or at least parts thereof) by the flow guide element. Thus, the cleaning fluid (i.e., the jet) can be influenced in such a manner by means of the headwind directed at the see-through area in a targeted manner during the operation of the cleaning nozzle that it can strike the surface to be cleaned, i.e., the see-through area, optimally again (i.e. as if the vehicle was standing still and there was no headwind). The headwind is not necessarily directed at, i.e., focused onto, an entire outer surface of the see-through area; instead, the at least one flow guide element can direct or aim it at only a portion of the see-through area (e.g., a center of the see-through area).

The at least one flow guide element can basically have any geometric shape, said shape preferably being configured to guide a flow (headwind in this case) in such a manner along a predetermined contour of the flow guide element that the flow is guided along the contour and leaves the contour in a predetermined detachment area in a tangential direction (relative to the contour in the detachment area) and is thus directly focused or directed in the direction of the see-through area. The roof module can basically have one or more than one flow guide element. In the case at hand, a flow guide element is any type of body configured to guide a flow in an intended direction. For example, the flow guide element can be understood to be a spoiler. The at least one flow guide element can be understood to be a type of nozzle through which the headwind is channeled and thus directed at the see-through area. To this end, the flow guide element can basically have any geometries, grooves, openings, channels, rounded portions, areas of a conical shape, or the like. The headwind can preferably be directed in such a manner by the flow guide element that it is oriented at least partially parallel to a main exit direction of the cleaning fluid leaving the cleaning nozzle.

Instead of configuring a cleaning nozzle with a higher exit speed, which generally tends to require an increase in nozzle pressure, the cleaning effect can be optimized by means of an unchanged cleaning nozzle according to the invention. After all, according to the invention, at least one flow guide element through which headwind (and potentially added (sometimes turbulent) ambient wind) can preferably be focused onto or directed at at least part of the see-through area is provided. Thus, known cleaning nozzles can continue to be used.

The solution according to the invention is basically also suitable for retrofit solutions and can, for example, be combined with existing cleaning nozzles to at least some extent. Since, according to the invention, the cleaning fluid is no longer deflected by headwind and is instead directed at the see-through area even more precisely, the cleaning effect can be increased with an existing cleaning nozzle compared to the state of the art. Moreover, the solution according to the invention does not require a higher system pressure level, which means that the costs for supply lines, a compressor, if applicable, a pump, if applicable, and at least one cleaning nozzle do not increase compared to the state of the art. Instead, by providing at least one additional element in the form of the flow guide element, air flowing along the outside of the vehicle, i.e., the headwind, is steered in such a manner that the cleaning fluid leaving the cleaning nozzle during cleaning is directed at or focused onto the see-through area in a predetermined manner (i.e., in a manner defined by the flow contour of the flow guide element). Thus, the headwind can preferably increase a speed at which the cleaning fluid strikes the see-through area since the cleaning fluid is carried along by the headwind and consequently strikes the see-through area at a higher speed caused by the headwind.

The flow guide element can focus the cleaning jet of the at least one cleaning nozzle onto at least part of the see-through area in a targeted manner in the operating or cleaning mode and accelerate it in the process. This effect can preferably be heightened by increasing the vehicle speed since the cleaning fluid is accelerated more and more by the headwind. So the cleaning fluid is no longer deflected by the headwind; instead, the headwind is utilized by means of the flow guide elements to direct the cleaning fluid at the see-through area as directly as possible. Thus, the cleaning of the see-through area can be significantly improved by means of the at least one flow guide element, preferably as a function of the driving speed. Moreover, the flow guide element according to the invention allows the cleaning to be at least partially dispensed with or at least minimized since focusing the headwind onto at least part of the see-through area turns the headwind itself into a kind of gaseous cleaning fluid flow which minimizes an adherence of dirt particles and/or insects to the see-through area and has the effect that the see-through area accumulates less dirt overall. This minimizes in particular the amount of cleaning fluid needed. In other words, the flow guide element reduces the accumulation of, for example, rain water and dirt on the see-through area since neither can adhere to the latter because of the headwind flow directed at the see-through area. The principle according to the invention, which is achieved by the flow guide element, can basically be utilized both for liquid-based cleaning and gas-based cleaning with unlimited effectiveness.

The at least one flow guide element according to the invention proves particularly effective if the at least one cleaning nozzle is disposed to the left and/or to the right of environment sensor relative to the line of sight of the environment sensor along its optical axis. A respective main exit direction of the at least one cleaning nozzle is preferably oblique (i.e., 0°, e.g., in an angle range of ±55° to 85°) to the optical axis. Such a lateral situation of the at least one cleaning nozzle can be advantageous since a transverse beam of the roof frame has to be perforated, for example, to dispose the cleaning nozzle in front of the environment sensor. Furthermore, only little installation space is needed for the lateral situation of the at least one cleaning nozzle relative to the line of sight of the environment sensor, which is always advantageous. Particularly preferably, at least two cleaning nozzles are provided, which are disposed on the right and on the left at a distance from each other on the panel component, preferably symmetrically to the optical axis of the environment sensor, outside of the field of view of the environment sensor. In this configuration, it is possible, for one, to establish an ideal area of overlap of the fluid cones since the fluid nozzles can be directed at the see-through area from both sides, preferably mirror-symmetrical to the optical axis. Furthermore, if the see-through area is large, it is possible for one semi-surface of the see-through area to be cleaned by one of the two cleaning nozzles and for the other semi-surface of the see-through area to be cleaned by the other one of the two cleaning nozzles. Also, this lateral situation is preferred since the cleaning nozzles are preferably not disposed in a field of view of the environment sensor an d therefore do not negatively affect the detection of the vehicle environment. If the at least one cleaning nozzle is disposed laterally in this manner, the flow guide element according to the invention also has a particularly large improving effect on the cleaning since the oblique angle of inclination in the case of such a lateral situation normally (i.e., without a flow guide element according to the invention) has the effect that headwind and ambient wind affect, i.e., deflect, the cleaning fluid especially strongly. This can be avoided by means of the flow guide element since the flow guide element guides the flow of the headwind onto the see-through area in a targeted manner.

Furthermore, the flow guide element according to the invention is advantageous in particular if it is fixed on the outer side of the panel component since a cross bracing of the vehicle roof or the panel component is not negatively affected by holes (e.g., as they would be required for nozzles in a transverse beam or the like). In the simplest case, the flow guide element can be glued, soldered or welded onto the panel component, for example, such a type of fixation being particularly suitable for a retrofit.

"At least one environment sensor" means that the roof module can comprise one or more than one environment sensor. "At least one cleaning nozzle" means that the roof module can comprise one or more than one cleaning nozzle. A field of view of the environment sensor preferably extends symmetrically around the optical axis of the environment sensor in the shape of a cone having a sensor-specific cone opening angle.

The roof module preferably comprises at least two cleaning nozzles, which are disposed on the panel component (and preferably retractable and deployable) and spaced apart from each other. For cleaning, the roof module can further have one or more than one tube and/or a tank for cleaning liquid or cleaning gas. Alternatively, it is also possible for an existing tank for cleaning fluid for cleaning the front and rear windows in the vehicle to be used as a reservoir for the cleaning liquid.

The roof module according to the invention can form a structural unit in which features for autonomous or semi-autonomous driving assisted by driver assistance systems are integrated and which can be placed on a vehicle body shell as a unit by a vehicle manufacturer. Furthermore, the roof module according to the invention can be a purely fixed roof or a roof including a roof opening system. Moreover, the roof module can be configured for use in a passenger car or in a utility vehicle. The roof module can preferably be provided as a structural unit in the form of a roof sensor module (RSM), in which the environment sensors are provided, to be inserted into a roof frame of a vehicle body as a suppliable structural unit.

The environment sensor of the roof module according to the invention can basically be configured in various ways and can in particular comprise a lidar sensor, a radar sensor, an optical sensor, such as a camera, and/or the like. Lidar sensors, for example, operate in a wavelength range of 905 nm or approx. 1550 nm. The material of the roof skin in the see-through area should be transparent to the wavelength range used by the environment sensor and should therefore be selected as a function of the wavelength range(s) used by the environment sensor.

In a preferred embodiment, the at least one environment sensor is disposed in a preferably central front area of the roof skin in relation to the driving direction. A line of sight of the environment sensor is preferably essentially (±10%) oriented in the driving direction. In this embodiment, the at least one cleaning nozzle is disposed in front of the see-through area toward the front with respect to the line of sight of the environment sensor, and the at least one flow guide element is disposed in front of the at least one cleaning nozzle toward the front with respect to the line of sight of the environment sensor. This embodiment serves in particular to clarify respective relative positions of the environment sensor relative to the cleaning nozzle and of the cleaning nozzle to the flow guide element. In the case at hand, the environment sensor is preferably disposed in a front area (relative to the driving direction) of the roof module, for example, behind the front roof rail (of the roof module), which defines a front header. The cleaning nozzle is disposed in front of the see-through area of the environment sensor toward the front and preferably placed to the right and/or to the left (with respect to the line of sight) of the see-through area. So the cleaning nozzle preferably has a smaller distance from the front roof rail than the see-through area of the environment sensor has. The flow guide element is disposed in front of the cleaning nozzle. The flow guide element preferably has a smaller distance from the front roof rail than the cleaning nozzle has. In this situation, the flow guide element thus preferably forms a front spoiler of the roof. By disposing the flow guide element in this manner, it is possible for headwind to be focused in such a manner that it can strike the see-through area from the front, a main direction of the flow guidance of the headwind preferably being essentially parallel (i.e., 0°±15%) to a main exit direction (main cone axis) of the cleaning fluid from the cleaning nozzle.

In a preferred embodiment, the at least one environment sensor is disposed in a preferably central rear area of the roof skin with respect to a driving direction. In this situation, a line of sight of the environment sensor is preferably oriented essentially (±10%) opposite to the driving direction. The at least one cleaning nozzle is disposed in front of the see-through area toward the rear with respect to the line of sight of the environment sensor. The at least one flow guide element is disposed behind the at least one environment sensor with respect to the line of sight of the environment sensor. This embodiment may be present alternatively or additionally depending on the roof module. For instance, one environment sensor can be disposed at the front of the roof module and another environment sensor can be disposed at the rear of the roof module. The embodiment serves in particular to clarify respective relative positions of the environment sensor relative to the cleaning nozzle and of the environment sensor to the flow guide element. The environment sensor is preferably disposed in a rear area of the roof module (in relation to the driving direction), for example, behind the rear roof rail, which defines a rear header. The cleaning nozzle is disposed in front of the see-through area of the environment sensor toward the rear with respect to the line of sight of the environment sensor and preferably to the right and/or to the left (relative to its line of sight) thereof. So the cleaning nozzle preferably has a smaller distance from the rear roof rail than the see-through area of the environment sensor has. The flow guide element is disposed in front of the environment sensor toward the rear with respect to the driving direction. In this situation, the flow guide element thus preferably forms a rear spoiler of the roof. The flow guide element preferably has a larger distance from the rear roof rail (of the roof module) than the environment sensor has. So the flow guide element is disposed further toward a center of the roof module or the panel component. Disposing the flow guide element in this manner allows headwind to be steered in such a manner that it is at least partially deflected onto the see-through area of the environment sensor and focused thereon.

In a preferred embodiment, the at least one environment sensor is disposed in a rear corner area of the roof skin with respect to a driving direction. In this situation, the environment sensor has a line of sight opposite and at an angle to the driving direction. The at least one cleaning nozzle is disposed in front of the see-through area toward the rear with respect to the line of sight of the environment sensor in the rear corner area. The at least one flow guide element is disposed in front of the at least one environment sensor on a lateral area of the roof skin, preferably in the area of a side rail of the roof module, with respect to the driving direction. In the case at hand, the term "at an angle" means an orientation other than 0°, i.e., not parallel to the driving direction. For example, the environment sensor can be oriented at an angle of ±90°, preferably ±45°, to the driving direction. This embodiment can be present alternatively or additionally depending on the roof module. The cleaning nozzle is disposed in front of the see-through area of the environment sensor with respect to the line of sight of the environment sensor and is preferably placed to the right and/or to the left of the environment sensor (with respect to its line of sight) thereof and preferably directed at the see-through area from the side. So the cleaning nozzle preferably has a smaller distance from the respective side rail and/or the respective rear rail than the see-through area of the environment sensor has. The flow guide element is disposed in front of the environment sensor in the area of the respective side rail with respect to the driving direction. In this situation, the flow guide element thus preferably forms a side spoiler of the roof and preferably projects laterally beyond the roof module in a vehicle width direction y. The flow guide element preferably has a smaller distance from the front roof rail (of the roof module) than the environment sensor has. So the flow guide element is closer to the front roof rail of the roof module or of the panel component. This situation of the flow guide element allows headwind to be steered laterally in such a manner that it is at least partially deflected onto the see-through area of the environment sensor and focused thereon.

In a preferred embodiment, the at least one environment sensor is disposed in a lateral area of the roof skin with respect to a driving direction. A line of sight of the environment sensor is perpendicular to the driving direction. The at least one cleaning nozzle is disposed laterally in front of the see-through area in the lateral area (of the respective side rail of the roof module) with respect to the line of sight of the environment sensor. The at least one flow guide element is disposed in front of the at least one environment sensor on a lateral area of the roof skin with respect to the driving direction. In the case at hand, the term "perpendicular" refers to an orientation of the environment sensor in which the optical axis is preferably essentially (±20%) orthogonal to the driving direction. This embodiment can be present alternatively or additionally depending on the roof module. The environment sensor is preferably disposed in a lateral area of the roof module (with respect to the driving direction), for example, offset in the direction of a center of the roof module relative to the side rail. The cleaning nozzle is disposed in front of the see-through area of the environment sensor with respect to the line of sight of the environment sensor and preferably placed to the right and/or to the left (with respect to its line of sight) thereof and is preferably directed at the see-through are from the side. So the cleaning nozzle preferably has a smaller distance from the respective side rail than the see-through area of the environment sensor has. The flow guide element is disposed in front of the environment sensor in the area of the respective side rail with respect to the driving direction. In this situation, the flow guide element thus preferably forms a side spoiler of the roof and preferably projects laterally beyond the roof module in a vehicle width direction y. The flow guide element preferably has a smaller distance from the front roof rail (of the roof module) than the environment sensor has. So the flow guide element is closer to the front roof rail of the roof module or of the panel component. This situation of the flow guide element allows headwind to be directed laterally in such a manner that it is at least partially directed at the see-through area of the environment sensor and focused thereon.

In a preferred embodiment, the at least one flow guide element is disposed on the roof skin in a fixed manner (i.e., static and immobile) relative to the roof skin or formed by the roof skin itself. So the flow guide element can preferably be glued, soldered or welded to the roof skin or connected thereto in any other manner (e.g., screwed, riveted or bolted) in a fixed place. This has the particular advantage that the flow guide element can also be placed on the roof skin at a later point. This has major advantages for retrofit since existing cleaning devices can be retrofitted with the flow guide element according to the invention. Alternatively or additionally, the flow guide element can also be formed by the roof skin or the panel component itself, in which case a contour and/or a shape of the flow guide element has to be defined at production (e.g., deep drawing) of the panel component (e.g., as a negative in the original mold). This integral design of the flow guide element has the advantage that no additional components which have to be installed are needed; instead, the flow guide element can be formed directly during production.

In a preferred embodiment, the at least one flow guide element is adjustable between a retracted position and at least one deployed position by an adjustment drive. The capability of retracting and deploying the at least one flow guide element has the advantage that the flow guide element does not protrude over the panel component at all times; instead, it can be deployed only when the at least one cleaning nozzle is used for cleaning. For example, the at least one flow guide element may not be deployed until a certain vehicle speed is reached, starting from which focusing the headwind onto the see-through area has a positive impact on the cleaning effect. The retracting and deploying capability in particular improves a visual appearance or a styling of the roof module and the motor vehicle since the visually unpleasant contours caused by the at least one flow guide element do not affect the appearance of the motor vehicle outside of the cleaning process. The flow guide element can also be adjusted to different deployed positions (between the retracted position and a maximum deployed position) as a function of speed and/or a predetermined cleaning program so as to allow a speed-optimized deflection of the headwind. For example, the adjustment drive can comprise an electric motor and/or a hydraulic drive and/or a pneumatic drive and/or a mechanical drive. The adjustment drive can also comprise a Bowden cable and/or a flexible shaft and/or one or more lever elements and/or a single- or multi-stage transmission and/or a return spring and/or the like.

In a preferred embodiment, the at least one cleaning nozzle can be configured to activate the adjustment drive. For example, in this embodiment, the cleaning nozzle can transmit a signal to the adjustment drive at the start of a cleaning process, causing the adjustment drive to deploy the at least one flow guide element. Alternatively or additionally, the at least one cleaning nozzle can be retractable and deployable. When the cleaning nozzle is deployed to start a cleaning process, a signal can be generated and transmitted to the adjustment drive, causing the adjustment drive to deploy the at least one flow guide element. It is also basically conceivable for the at least one cleaning nozzle and the at least one flow guide element to share a common adjustment drive and thus be able to be retracted and deployed simultaneously or at different times (e.g., by means of a standard transmission). In other words, the at least one cleaning nozzle can preferably be configured to directly or indirectly control the retraction and the deployment of the flow guide element.

In a preferred embodiment, the at least one cleaning nozzle is integrated in the at least one flow guide element. For example, the at least one cleaning nozzle can be inserted into the flow guide element, the flow guide element forming a housing of the at least one cleaning nozzle. If the flow guide element is formed integrally with the roof skin, the cleaning nozzle can be slid into such a flow guide element in a simple manner. A configuration as a separated component is also preferred, in which case at least part of a housing of the at least one cleaning nozzle preferably serves as the at least one flow guide element. A cleaning nozzle of this design can be configured to be retractable and deployable together with the flow guide element. In other words, the at least one cleaning nozzle can be configured to be adjusted between a retracted position and at least one deployed position together with the flow guide element. This embodiment is particularly (installation) space-saving since the flow guide element does not have to be disposed separately at a distance from the at least one cleaning nozzle. So at least part of a housing can preferably be configured as a headwind spoiler which focuses headwind directly onto the see-through area when the at least one cleaning nozzle is in the deployed state. In other words, the at least one housing of the at least one cleaning nozzle is swung out, i.e., deployed, when cleaning and at least partially forms a spoiler (the flow guide element) which focuses the headwind onto at least part of the see-through area. To this end, the housing, e.g., the lid part and/or side walls of the housing, can be shaped aerodynamically and have one or more curvatures, channels, air gaps, and/or other shaping elements, for example. The aerodynamic shaping of the housing can be provided by one or more components which can be mounted on the housing. Alternatively, the aerodynamic shaping can also be provided by the integral design of the housing.

In a preferred embodiment, the at least one cleaning nozzle is disposed outside of a field of view of the environment sensor. The at least one cleaning nozzle is preferably oriented in such a manner relative to the optical axis that a fluid cone produced during cleaning strikes the see-through area at an oblique angle with its main exit direction (its cone axis). The see-through area itself can have a curved shape. This embodiment has the advantage that the at least one cleaning nozzle does not negatively affect the environment sensor in detecting the vehicle environment.

Basically any type of environment sensor can be installed in the roof module. The use of lidar sensors and/or radar sensors and/or camera sensors and/or multi-camera sensors is particularly advantageous.

Of course, the embodiments and the illustrative examples mentioned above and yet to be discussed can be realized not only individually but also in any combination with each other without departing from the scope of the present invention. Moreover, any and all embodiments and illustrative examples of the roof module also relate to a motor vehicle having such a roof module.

An embodiment of the invention is schematically illustrated in the drawing and will be discussed as an example below.

BRIEF DESCRIPTIONS OF THE DRAWINGS

DETAILED DESCRIPTION

Figure 1:
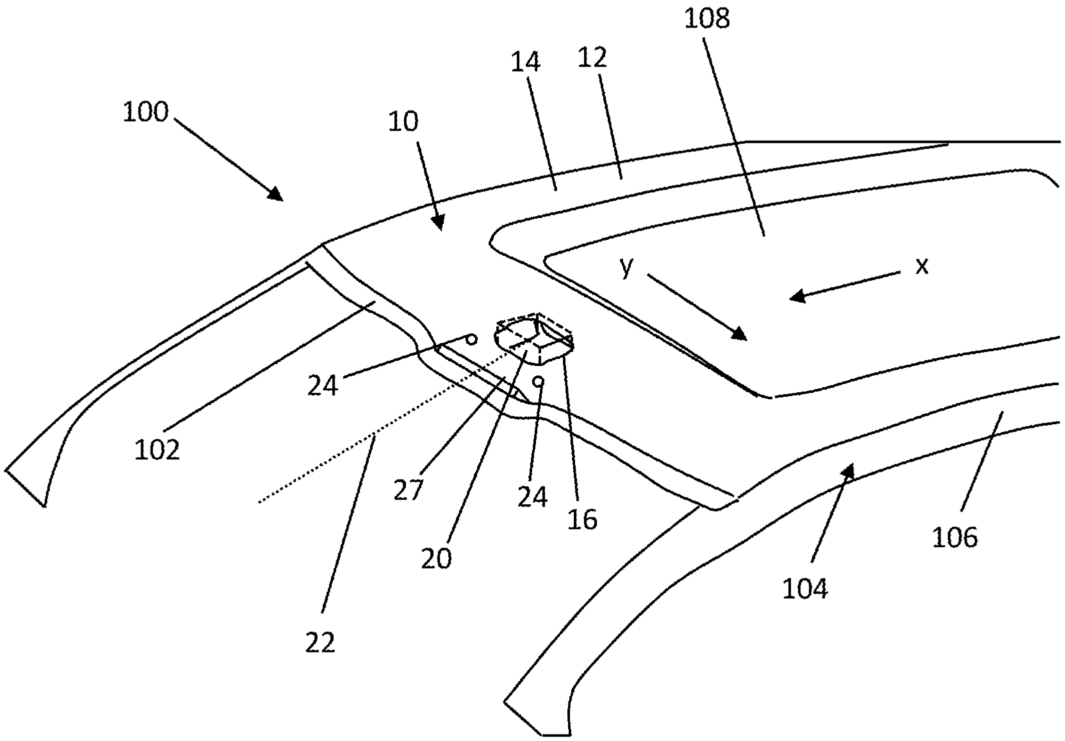
FIG. 1 is a perspective view of a vehicle roof having a roof module according to the invention.

FIG. 1 shows a vehicle roof 100 of a vehicle (not shown in full), which comprises a roof module 10. Roof module 10 is preferably inserted into a roof frame 104 of the vehicle as a structural unit or placed on at least two transverse rails 102 and at least two longitudinal rails 106 of the vehicle body, which form roof frame 104. In the illustrative example shown, roof module 10 has a panoramic roof 108.

Roof module 10 comprises a panel component 12 for forming a roof skin 14 of vehicle roof 100. In a front area of vehicle roof 100 or roof module 10 (in a longitudinal vehicle direction x, which corresponds to a driving direction of the motor vehicle), an environment sensor 16 is disposed symmetrically to the longitudinal vehicle axis. Environment sensor 16 is disposed directly behind a front transverse rail 102, which defines a roof header adjacent to a windshield (not shown) of the vehicle. Environment sensor 16 can be retractable and deployable or be fixed to panel component 12. In the case at hand, environment sensor 16 is disposed inside roof module 10 and covered by panel component 12. Environment sensor 16 is disposed in a sensor housing 18, which forms a dry section, in which environment sensor 16 is disposed in a moisture-proof manner. In the case at hand, environment sensor 16 is a lidar sensor. However, other sensor types, such as (multi-directional) cameras, which are used for (semi-)autonomous driving, can be employed, as well.

Roof module 10 comprises a see-through area 20, which can be made of a preferably shatter-proof plastic, glass, or another (partially) transparent material, for example. Environment sensor 16 is oriented along an optical axis 22, which is parallel to longitudinal vehicle direction x in the case of FIG. 1. A field of view 23 of environment sensor 16, in which environment sensor 16 can send and/or receive electromagnetic signals to thus detect a vehicle environment, extends conically around the optical axis. In the case at hand, see-through area 20 is disposed in panel component 12 and embedded therein in the manner of a window, for example. In the case at hand, see-through area 20 is curved and follows a shape of the surrounding panel component, resulting in a flush contour.

Figure 5:
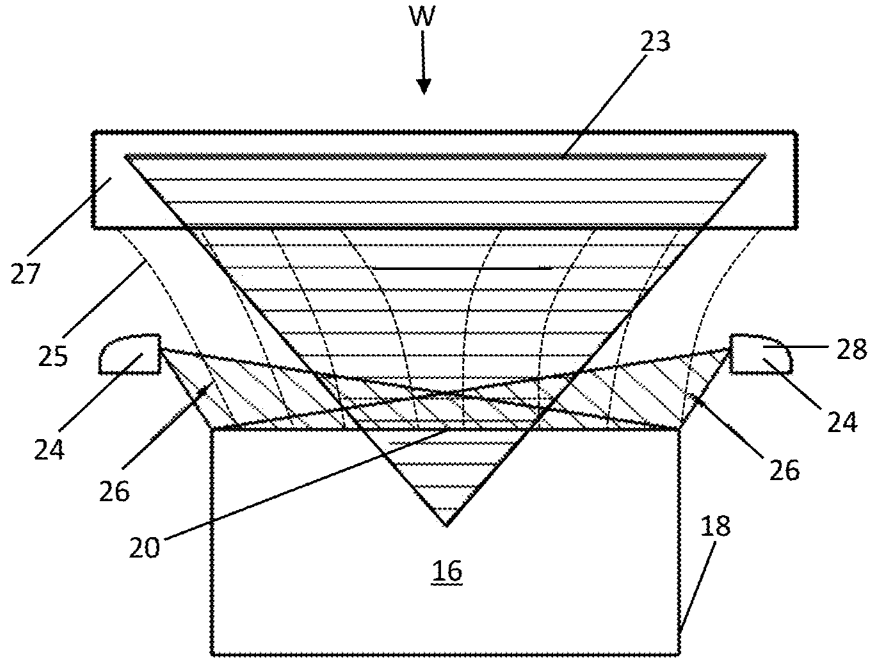
FIG. 5 shows a fourth illustrative example of the roof module according to the invention, which has two cleaning nozzles disposed laterally in relation to a see-through area in a front area of the roof module.
Figure 6:
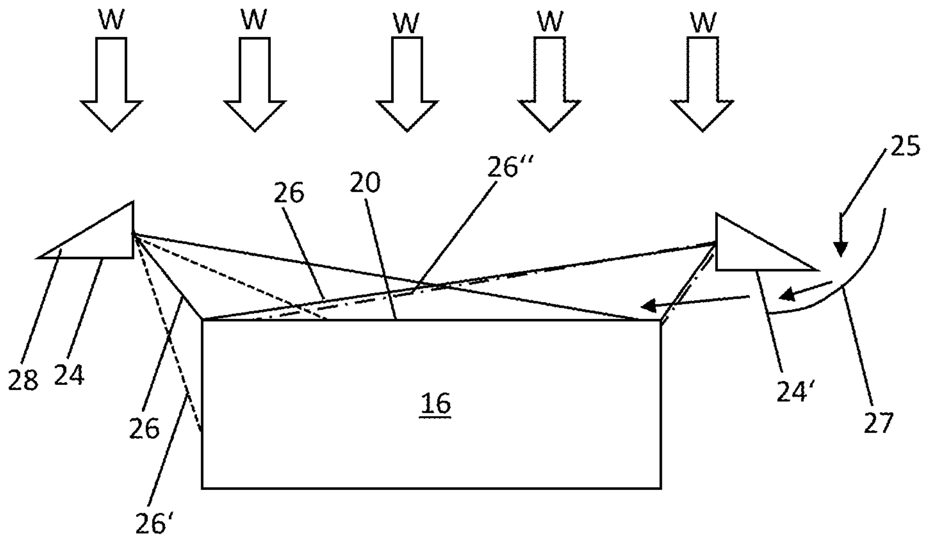
FIG. 6 shows a comparison between cleaning with a flow guide element and cleaning without a flow guide element.

Roof module 10 further comprises at least one cleaning nozzle 24, by means of which see-through area 20 can be cleaned. In FIGS. 1, 5, and 6, roof module 10 is shown with two cleaning nozzles 24, each of which is supplied with a cleaning fluid (such as a liquid or a gas) through a supply channel (not shown). The two cleaning nozzles 24 are disposed in front of see-through area 20 outside of conical field of view 23 to the right and to the left of environment sensor 16 with respect to a line of sight of environment sensor 16 and are preferably positioned at an angle relative to each other so that see-through area 20 can be cleaned from two different directions. The cleaning fluid can be soap water, for example. Alternatively, cleaning with pressurized air or another pressurized gas is conceivable, as well. When the cleaning fluid exits cleaning nozzles 24, respective fluid cones 26 are produced, which strike see-through area 20 and clean it (see FIG. 5). Fluid cones 26 can preferably at least partially overlap in an area of overlap of see-through area 20 (see FIG. 5).

Figure 2:
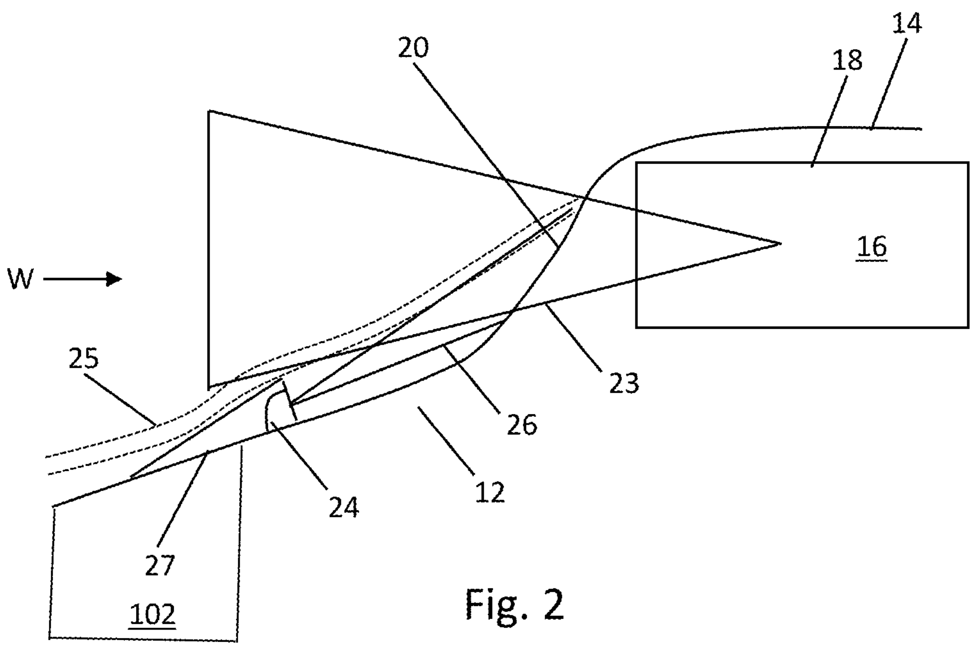
FIG. 2 shows a first illustrative example of the roof module according to the invention, which has a cleaning nozzle integrated in a flow guide element in a front area of the roof module.

According to the invention, roof module 10 has at least one flow guide element 27, which is fixed to panel component 12 (see FIG. 2), retractable and deployable (see FIGS. 3 and 4), or formed integrally by panel component 12. Flow guide element 27 allows headwind W to be focused onto at least part of see-through area 20 so that fluid cone 26 of respective cleaning nozzle 24 is captured by headwind W and accelerated or carried toward see-through area 20. So a deflected flow 25 of headwind W directly onto the see-through area is caused, which is essentially impacted by a flow contour of flow guide element 27. Flow guide element 27 can basically have any geometric design. For instance, flow guide element 27 can have an oblong wedge shape (see FIGS. 1 to 5 in partially different views of the wedge), can have a curved wedge shape, or can be shaped as a curved outer contour of a lateral area of roof module 10. For at least partially channeling the headwind, flow guide element 27 can also comprise a channel portion 29, as indicated in FIG. 2, which at least partially penetrates flow guide element 27 (e.g., in the form of a passage hole). Channel portion 29 can conically taper so as to accelerate the headwind toward the see-through area in the manner of a nozzle.

Figure 3:
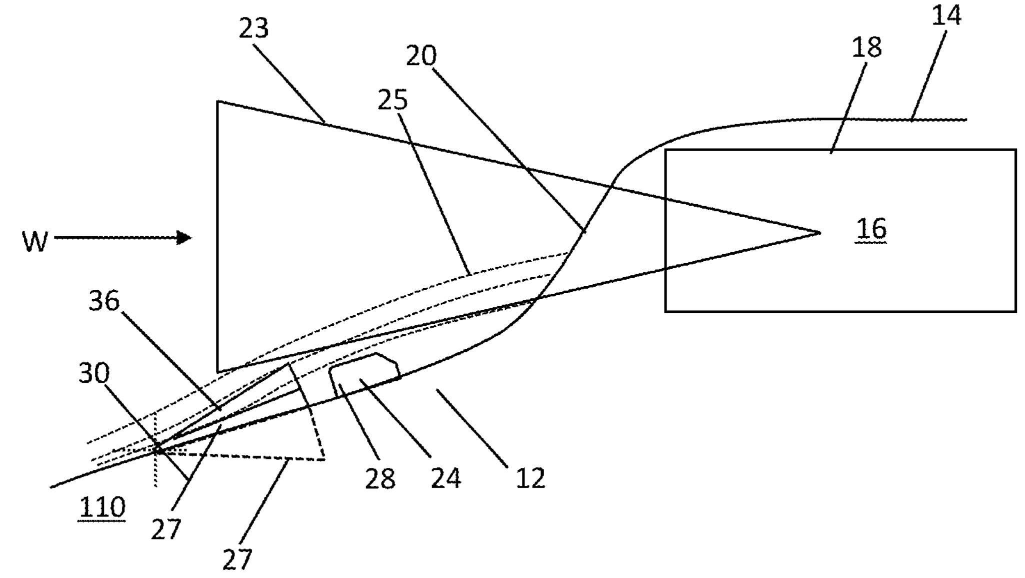
FIG. 3 shows a second illustrative example of the roof module according to the invention, which has a retractable and deployable flow guide element and a cleaning nozzle in a front area of the roof module.
Figure 4:
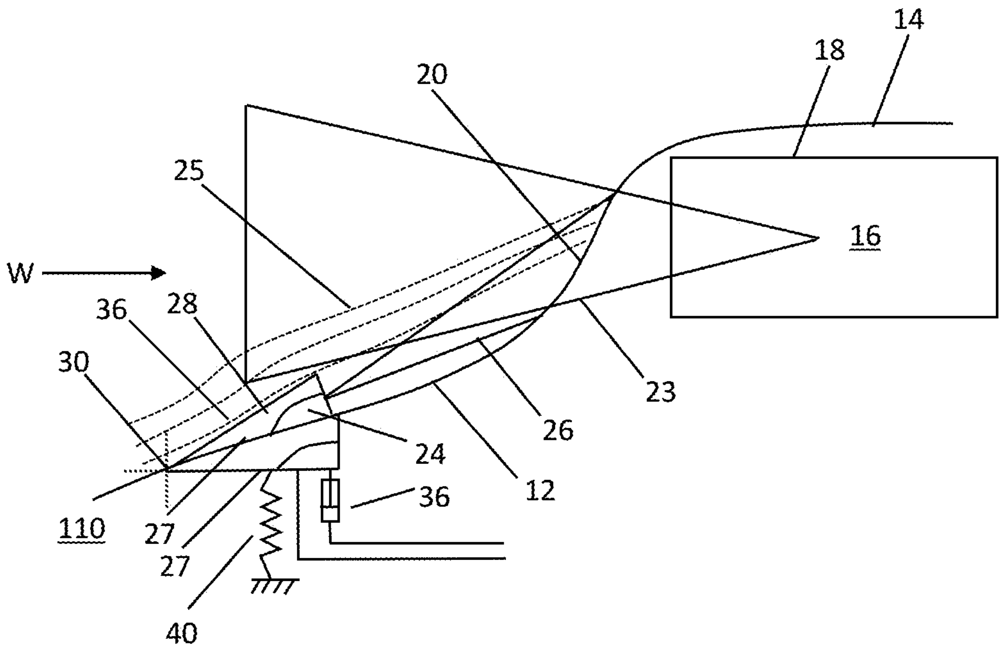
FIG. 4 shows a third illustrative example of the roof module according to the invention, which has a retractable and deployable cleaning nozzle integrated in a flow guide element and including an adjustment mechanism in a front area of the roof module.

Cleaning nozzle 24 can be integrated in flow guide element 27, in which case flow guide element 27 forms a housing 28 of cleaning nozzle 24 (see FIGS. 2 and 4). Housing 28, i.e., flow guide element 27, can be fixed to panel component 12 together with integrated, e.g., inserted, cleaning nozzle 24, as seen in FIG. 2. Cleaning nozzle 24 can basically also be spaced apart from flow guide element 27 and be disposed in its own housing 28 (see FIGS. 5 and 6). Alternatively or additionally, one of flow guide elements 27 can, for example, also be mounted on frame structure 110 and be mounted thereon in an adjustable or movable manner so that flow guide element 27 can be moved between a refracted position and at least one deployed position (see both positions in FIG. 4) together with the at least one cleaning nozzle 24. The flow guide element 27 can also be retractable and deployable without an integrated cleaning nozzle 24, as seen in FIG. 3. According to FIG. 4, flow guide element 27 can be rotated between the retracted position and the deployed position about an axis of rotation 30 together with cleaning nozzle 24.

The movability between the retracted position and the deployed position is provided by an adjustment drive 34. An exemplary adjustment drive 34 is schematically illustrated in FIG. 4. Adjustment drive 34 enables flow guide element 27 to be adjusted in such a manner that at least one lid part 36 of flow guide element 27 or a lid part 36 of housing 28 (if cleaning nozzle 24 is integrated in flow guide element 27) is flush with the outer surface of roof skin 14 of the vehicle roof when the at least one cleaning nozzle 24 is in the retracted position (see respective positions in FIGS. 3 and 4). When the at least one flow guide element 27 is in the retracted position on the other hand, flow guide element 27 at least partially protrudes over the outer surface of roof skin 14 of vehicle roof 100, the flow guide element thus acting as a (head) wind spoiler when in the deployed state, said spoiler focusing headwind W directly onto see-through area 20. By focusing headwind W, a more effective cleaning of see-through area 20 is possible. Flow guide element 27 focuses deflected flow 25 onto the see-through area in such a manner that it is preferably at least partially oriented parallel to a striking direction of the cleaning fluid.

In the case shown in FIG. 4, adjustment drive 34 comprises a pneumatic drive 38, which can be a pressure control valve, for example. Furthermore, flow guide element 27 is biased into one of the positions (i.e., either into the retracted position or into the deployed position) by a bias spring 40 with the result that drive 38 has to generate a counterforce against bias spring 40. Flow guide element 27 will be returned to the biased original position without drive 38 by the restoring force of bias spring 40. Other types of drives are basically conceivable, as well, and can be advantageous depending on the configuration of roof module 10.

In summary, FIG. 2 shows flow guide element 27 with integrated cleaning nozzle 24 in a fixed situation on panel component 12. Environment sensor 16 is disposed under roof skin 14 behind front transverse rail 102 with respect to driving direction x. Flow guide element 27 is disposed in front of environment sensor 16 toward the front with respect to the line of sight of environment sensor 16.

FIG. 3 shows flow guide element 27 in a retractable and deployable configuration. Cleaning nozzle 24 is spaced apart from flow guide element 27. Environment sensor 16 is disposed under roof skin 14 behind front transverse rail 102 with respect to driving direction x. Cleaning nozzle 24 is disposed in front of environment sensor 16 toward the front with respect to the line of sight of environment sensor 16. Flow guide element 27 is disposed in front of cleaning nozzle 24 with respect to the line of sight of the environment sensor 16.

FIG. 4 shows flow guide element 27 with integrated cleaning nozzle 24 in a retractable and deployable configuration on panel component 12. Environment sensor 16 is disposed under roof skin 14 behind front transverse rail 102 with respect to driving direction x. Flow guide element 27, together with cleaning nozzle 24, is disposed in front of environment sensor 16 toward the front with respect to the line of sight of environment sensor 16.

FIG. 5 shows a top view of the front area of roof module 10 from above. With respect to the line of sight of environment sensor 16, respective cleaning nozzles 24 are disposed on the left and on the right in front of see-through area 20 toward the front. Flow guide element 27 is disposed forward of cleaning nozzles 24 with respect to the line of sight of environment sensor 16.

FIG. 6 shows a comparison between cleaning by means of a cleaning nozzle 24 using a flow guide element 27 and cleaning without a flow guide element 27 in a top view from above. Environment sensor 16 is disposed in a front area of roof module 10. An ideal fluid cone 26 of first cleaning nozzle 24 (on the left in the Figure) is indicated by solid lines. An ideal fluid cone 26 of second cleaning nozzle 24' (on the right in the Figure) is also indicated by solid lines. Said fluid cones 26 correspond to fluid cones produced if see-through area 20 is cleaned without wind, i.e., without the effect of headwind W. A densely dashed line indicates a fluid cone 26' disturbed by headwind W as a comparison for first cleaning nozzle 24. As can be seen, disturbed fluid cone 26' strikes only a portion of the see-through area compared to ideal fluid cone 26 with the result that the cleaning effect of first cleaning nozzle 24 decreases. On the left-hand side, flow guide element 27 is disposed on the other hand. Flow guide element 27 focuses the headwind onto at least part of see-through area 20 with the result that see-through area 20 is essentially free from wind. As a result, the impact of flow guide element 27 directs a fluid cone 26" (shown as a dashed and dotted line) at see-through area 20 in such a manner compared to its ideal state that flow guide element 27 can bring the cleaning effect closer to a wind-free ideal case. According to FIG. 6, flow guide element 27 can also be adjustable so that its orientation can be adapted depending on the incoming direction of the headwind and/or potentially added side wind. To this end, flow guide element 27 can be adjustable relative to a bearing point by means of a retaining spring 42 or the like, for example. Such a retaining spring 42 is indicated in FIG. 6 in a stylized manner.

The invention claimed is:

1. A roof module for forming a vehicle roof on a motor vehicle, the roof module comprising:

a panel component which at least partially forms a roof skin of the vehicle roof, the roof skin serving as an outer sealing surface of the roof module;

at least one environment sensor configured to send and/or receive electromagnetic signals through a see-through area for detecting a vehicle environment, wherein the see-through area follows a shape of the surrounding panel component, resulting in a flush contour, and at least one cleaning nozzle configured to clean the see-through area, the at least one cleaning nozzle having a retracted position wherein at least one flow guide element is disposed on the panel component, the at least one flow guide element being configured to focus headwind onto at least part of the see-through area, the at least one flow guide element being adjustable between a retracted position and at least one deployed position by an adjustment drive, wherein the at least one flow guide element is configured such that at least one lid part of the at least one flow guide element or a lid part of a housing of cleaning nozzle is integrated in the at least one flow guide element is flush with the outer surface of roof skin of the vehicle roof when the at least one cleaning nozzle is in the retracted position, and wherein the at least one cleaning nozzle is disposed laterally on the left and/or right along an optical axis of the at least one environment sensor, and configured that a fluid cone is captured by the headwind and aerodynamically guided, via the at least one flow guide element positioned on the panel component, toward the see-through area.

2. The roof module according to claim 1, wherein the at least one environment sensor is disposed in a rear corner area of the roof skin with respect to a driving direction, and a line of sight of the environment sensor is oriented opposite and at an angle to the driving direction, the at least one cleaning nozzle is disposed in the rear corner area in front of the see-through area toward the rear with respect to the line of sight of the environment sensor, and the at least one flow guide element is disposed in front of the at least one environment sensor in a lateral area of the roof skin with respect to the driving direction.

3. The roof module according to claim 1, wherein the at least one environment sensor is disposed in a lateral area of the roof skin with respect to a driving direction, and a line of sight of the environment sensor is oriented perpendicular to the driving direction, the at least one cleaning nozzle is disposed laterally in front of the see-through area with respect to the line of sight of the environment sensor in the lateral area, and the at least one flow guide element is disposed in front of the at least one environment sensor on a lateral area of the roof skin with respect to the driving direction.

4. The roof module according to claim 1, wherein the at least one flow guide element is disposed on the roof skin in a fixed manner relative to the roof skin or is formed by the roof skin.

5. The roof module according to claim 1, wherein the at least one cleaning nozzle is configured to activate the adjustment drive.

6. The roof module according to claim 1, wherein the adjustment drive comprises at least one of a hydraulic, pneumatic and mechanical drive.

7. The roof module according to claim 1, wherein the at least one cleaning nozzle is disposed outside of a field of view of the environment sensor.

8. The roof module according to claim 1, wherein the at least one environment sensor is a lidar sensor and/or a radar sensor and/or a camera sensor and/or a multi-camera sensor.

9. A motor vehicle comprising a roof module according to claim 1.

10. The roof module according to claim 1, wherein the at least one cleaning nozzle cleans the see-through area by a fluid cone, and wherein the fluid cone of at least one cleaning nozzle is configured to be caught by the headwind and accelerated in the direction of the see-through area.

* * * * *